US010274965B2

(12) United States Patent
Nguyen et al.

(10) Patent No.: US 10,274,965 B2
(45) Date of Patent: Apr. 30, 2019

(54) SENSOR SYSTEM FOR VEHICLE

(71) Applicants: DENSO International America, Inc., Southfield, MI (US); DENSO CORPORATION, Kariya-shi, Aichi-ken (JP)

(72) Inventors: Trong Duy Nguyen, Novi, MI (US); Lorraine Novak, Troy, MI (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 208 days.

(21) Appl. No.: 15/295,221

(22) Filed: Oct. 17, 2016

(65) Prior Publication Data
US 2018/0107225 A1 Apr. 19, 2018

(51) Int. Cl.
| G05D 1/02 | (2006.01) |
| G06K 9/00 | (2006.01) |
| G05D 1/00 | (2006.01) |
| G01C 21/34 | (2006.01) |
| G01C 11/02 | (2006.01) |
| H04N 13/239 | (2018.01) |
| B60W 30/09 | (2012.01) |
| G08G 1/16 | (2006.01) |

(52) U.S. Cl.
CPC ........... *G05D 1/0251* (2013.01); *B60W 30/09* (2013.01); *G01C 11/02* (2013.01); *G01C 21/3407* (2013.01); *G05D 1/0094* (2013.01); *G05D 1/0278* (2013.01); *G06K 9/00805* (2013.01); *G08G 1/166* (2013.01); *H04N 13/239* (2018.05); *G05D 2201/0213* (2013.01); *H04N 2213/001* (2013.01)

(58) Field of Classification Search
None
See application file for complete search history.

(56) References Cited

U.S. PATENT DOCUMENTS

| 9,045,144 B2 * | 6/2015 | Schwindt .......... B60W 50/0097 |
| 9,760,090 B2 * | 9/2017 | Shashua ............... G05D 1/0088 |
| 2002/0017985 A1 | 2/2002 | Schofield et al. |
| 2009/0185720 A1 | 7/2009 | Kurpinski et al. |
| 2013/0135444 A1 * | 5/2013 | Stein .................. B60R 1/00 348/47 |
| 2014/0192196 A1 | 7/2014 | Englander |
| 2014/0247352 A1 | 9/2014 | Rathi et al. |
| 2017/0010616 A1 * | 1/2017 | Shashua ................ G01C 21/32 |

OTHER PUBLICATIONS

Bumblebee 2 FireWire Stereo Vision Camera Systems (prior to Oct. 17, 2016); https://www.ptgrey.com/bumblebee2-firewire-stereo-vision-camera-systems.

* cited by examiner

Primary Examiner — Redhwan K Mawari
Assistant Examiner — Edward Torchinsky
(74) Attorney, Agent, or Firm — Harness, Dickey & Pierce, P.L.C.

(57) ABSTRACT

A sensor system for a vehicle including a first camera sensor and a second camera sensor configured to be mounted spaced apart from one another on a vehicle. A sensor module of the sensor system is configured to generate a three-dimensional image of an environment about the vehicle based on data collected by the first camera sensor and the second camera sensor.

18 Claims, 5 Drawing Sheets

SENSOR SYSTEM FOR VEHICLE

FIELD

The present disclosure relates to a sensor system for a vehicle, the system including at least two cameras configured to detect and track objects to enhance safety.

BACKGROUND

This section provides background information related to the present disclosure, which is not necessarily prior art.

Outfitting vehicles with camera sensor systems for monitoring the environment about the vehicle is becoming increasingly common, particularly for autonomous vehicles and/or vehicles including advanced driver assistance systems (ADAS). While current camera systems are suitable for their intended use, they are subject to improvement. For example, FIG. 1 illustrates an exemplary prior art system in which a vehicle 10 has a single sensor camera 12. The sensor camera 12 is arranged about mid-way between a left and right side of the vehicle 10, and has a field of vision area A'. The field of vision area A' is relatively narrow, and thus objects outside the field of vision area A' are not visible to the sensor camera 12. Further, if a truck 16 or other vehicle is blocking the view of the sensor camera 12, as illustrated in FIG. 1, camera "blindspots" $B_1$ and $B_2$ will occur in the field of vision area A'. Objects, such as vehicle 14 present in blindspot $B_1$, will not be visible to the sensor camera 12 when they are present in either of the blindspots $B_1$ or $B_2$. It would therefore be desirable to provide a broader field of vision, for example. The present teachings provide for an improved sensor system that has numerous advantages over current systems, as well as numerous unexpected results as one skilled in the art will recognize.

SUMMARY

This section provides a general summary of the disclosure, and is not a comprehensive disclosure of its full scope or all of its features.

The present teachings provide for a sensor system for a vehicle including a first camera sensor and a second camera sensor configured to be mounted spaced apart from one another on a vehicle. A sensor module of the sensor system is configured to generate a three-dimensional image of an environment about the vehicle based on data collected by the first camera sensor and the second camera sensor.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 2:
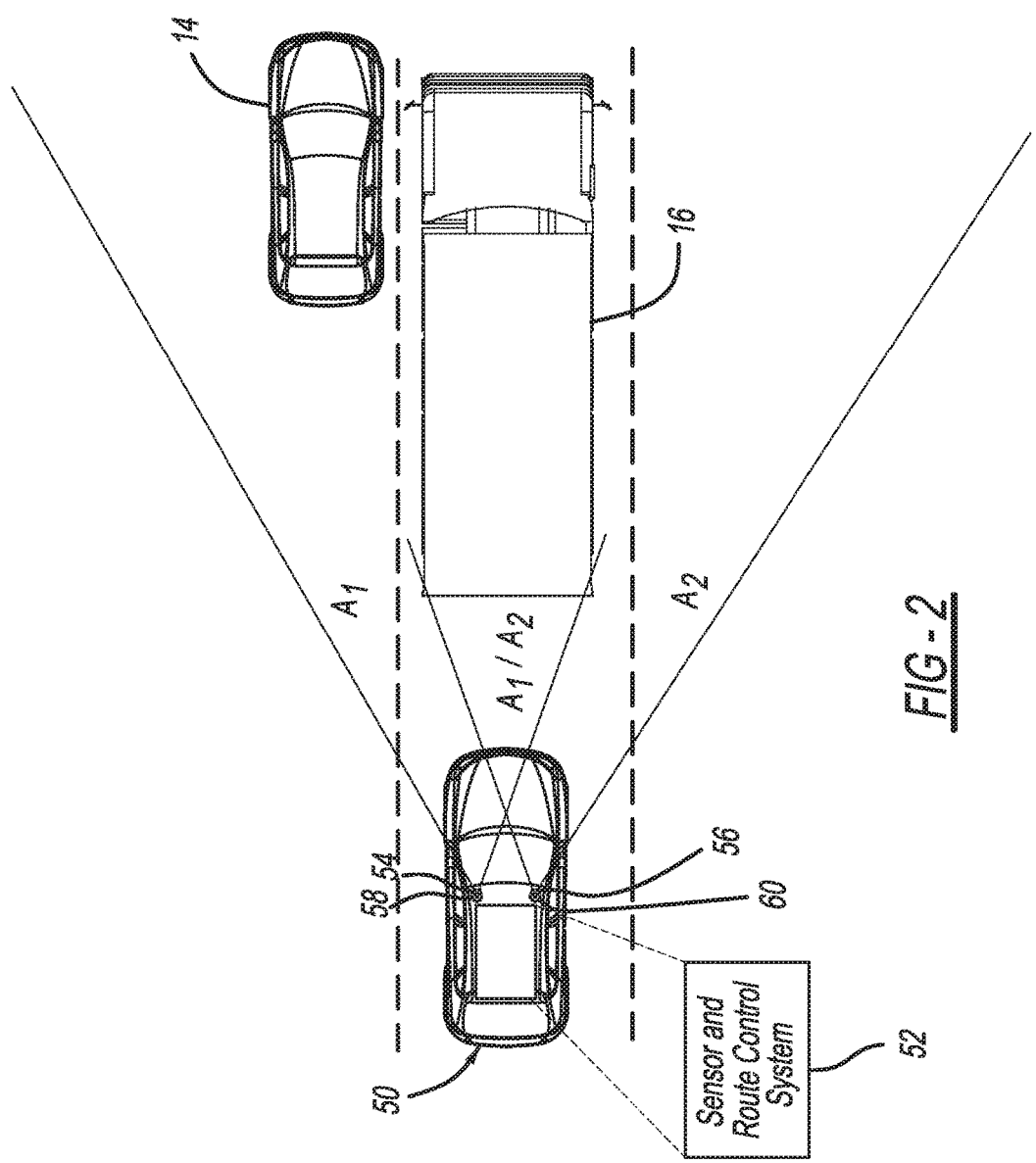
FIG. 2 is a top view of a vehicle including a sensor and route control system according to the present teachings, with two cameras of the system directed straight ahead of the vehicle.

FIG. 2 illustrates an exemplary vehicle 50 including a sensor and route control system 52 in accordance with the present teachings. A first camera sensor 54 and a second camera sensor 56 are mountable to the vehicle 50. The first and second camera sensors 54 and 56 can be any suitable camera sensors configured to sense an environment about the vehicle 50, and specifically configured to identify relevant objects, such as, but not limited to, pedestrians, vehicles, buildings, and any relevant obstacles. For example, the first and second camera sensors 54 and 56 can be any suitable multi-pose cameras operable to provide and/or enable the features of the present teachings.

The first and second camera sensors 54 and 56 can be mounted spaced apart at any suitable location about the vehicle 50, such as on a roof of the vehicle 50 as illustrated. The first and second camera sensors 54 and 56 can be mounted to the vehicle 50 with any suitable camera mount. For example, the first camera sensor 54 can be mounted to the vehicle 50 with a first camera mount 58, and the second camera sensor 56 can be mounted to the vehicle 50 with a second camera mount 60. The first and second camera mounts 58 and 60 are respectively configured to move the first and second camera sensors 54 and 56 in any suitable direction, such as left, right, up, and down.

Figure 1:
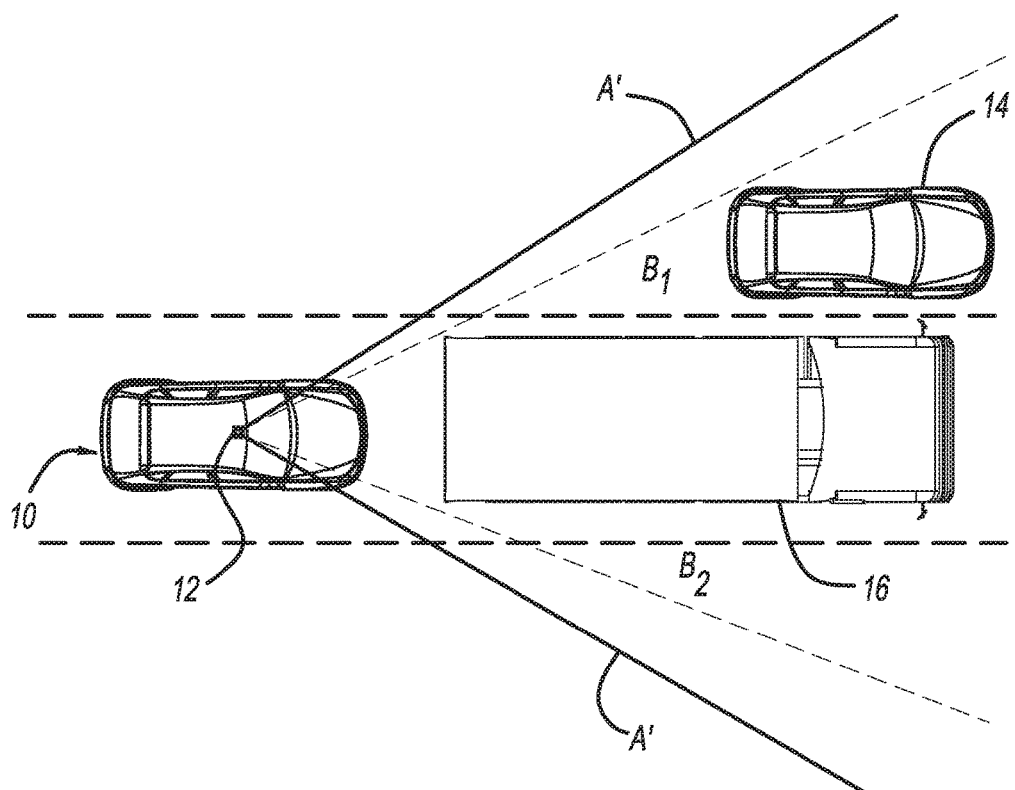
FIG. 1 is a top view of a vehicle including a prior art camera sensor system.

The first camera sensor 54 has a field of vision area $A_1$, and the second camera sensor 56 has a field of vision area $A_2$. Field of vision $A_1/A_2$ is the field of vision area where the fields of vision $A_1$ and $A_2$ overlap. The sensor and route control system 52 is configured to merge, combine, or blend images of the field of vision $A_1$ taken by the first camera sensor 54 with images of the field of vision $A_2$ taken with the second camera sensor 56 to generate a combined three-dimensional image of the environment about the vehicle 50, which includes areas $A_1$, $A_2$, and $A_1/A_2$, is wider than the field of view A' of the prior art sensor system of FIG. 1 having only a single sensor camera 12, and eliminates blindspots $B_1$ and $B_2$. Thus the sensor and route control system 52 according to the present teachings is able to identify and track the vehicle 14, unlike the sensor system of FIG. 1 in which the vehicle 14 is outside of the field of vision A'.

Figure 3:
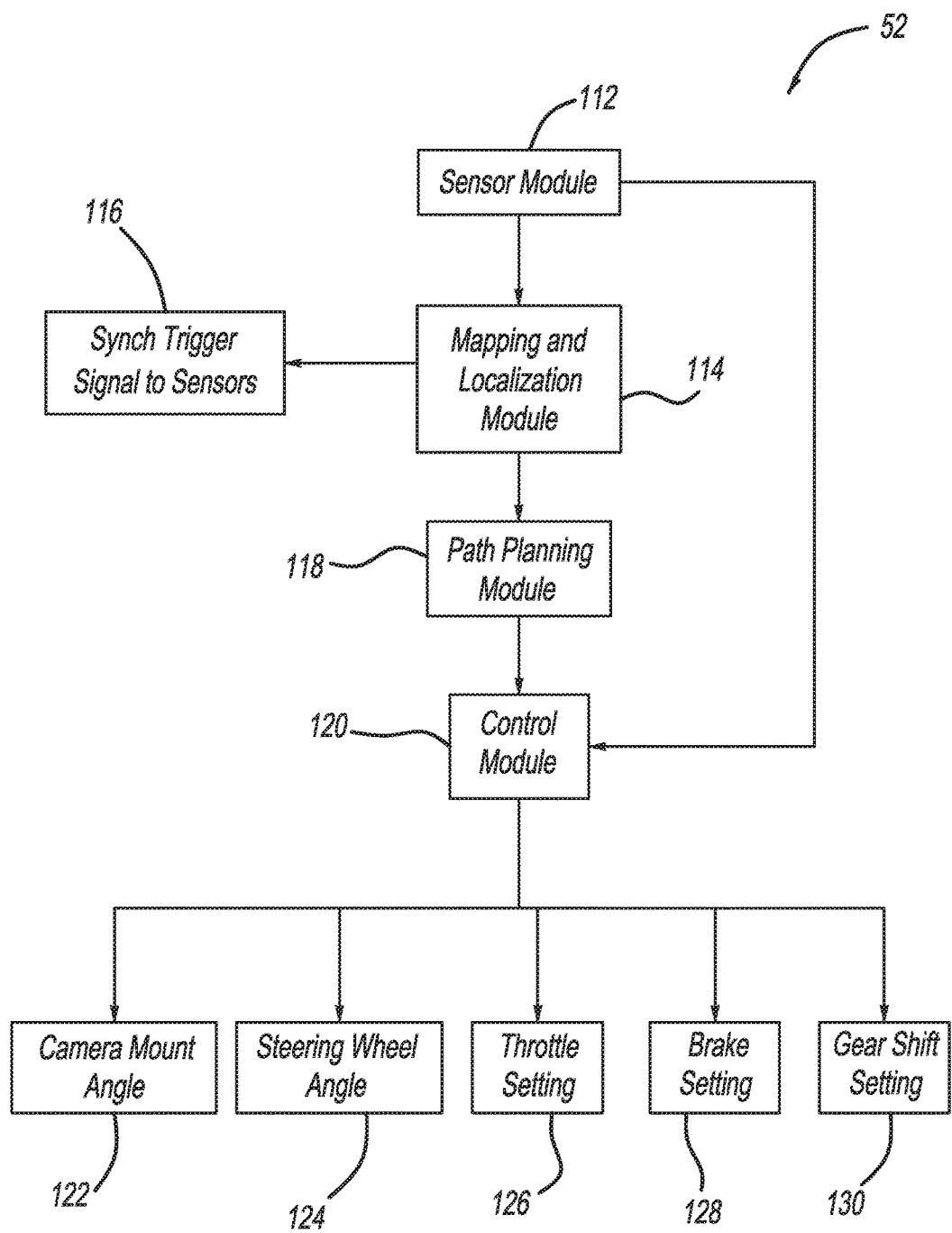
FIG. 3 is a chart illustrating operation of the sensor and route control system according to the present teachings.

With continued reference to FIG. 2, and additional reference to FIG. 3, the sensor and route control system 52 will now be described in additional detail. In this application, the term "module" may be replaced with the term "circuit." The term "module" may refer to, be part of, or include processor hardware (shared, dedicated, or group) that stores code executed by processor hardware. The code is configured to provide the features of the modules, controllers, and systems described herein. The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

With reference to block 112, the system 52 includes a sensor module 112, which is configured to receive data from each one of the first camera sensor 54 and the second camera sensor 56, the data corresponding to images of the environment about the vehicle 50 taken by each one of the first and second camera sensors 54 and 56. The sensor module 112 is configured to process and combine the image data from the first and second camera sensors 54 and 56 into a single three-dimensional image of the environment about the vehicle 50. The three-dimensional image has a width equal to at least the combined width of the field of vision areas $A_1$, $A_2$, and $A_1/A_2$, and eliminates blindspots $B_1$ and $B_2$. The width, or general size, of the three-dimensional image can be increased by moving the first and/or second camera sensors 54 and 56 to allow the first and/or second camera sensors 54 and 56 to capture additional portions of the environment about the vehicle 50. The sensor module 112 is further configured to identify objects within the three-dimensional image, such as pedestrians, vehicles, buildings, and obstacles, using any suitable object recognition techniques. The sensor module 112 is configured to output the three-dimensional image and data associated therewith to a mapping and localization module 114. The sensor module 112 is further configured to output data regarding location of any identified objects in the three-dimensional image (such as pedestrians, vehicles, buildings, obstacles, etc.) to a control module 120, which will be described further herein.

The mapping and localization module 114 is configured to generate a map of the environment about the vehicle 50 based on the three-dimensional image generated by the sensor module 112 (any additional map data may be used as well), and identify position of the vehicle 50 on the map. The map and data associated therewith, as well as the location of the vehicle 50 relative to the map, is output by the mapping and localization module 114 to a path planning module 118. The mapping and localization module 114 is further configured to output data for synchronizing a trigger signal to the first and second camera sensors 54 and 56 at block 116. The synch trigger signal is sent to the first and second camera sensors 54 and 56 to trigger the camera sensors 54 and 56 with a predetermined periodic signal, such as from the mapping and localization module 114. The first and second camera sensors 54 and 56 are configured to capture images by detecting a rising edge or a falling edge in the synch trigger signal. The synch trigger signal advantageously causes the first and second camera sensors 54 and 56 to obtain images of the environment at the same time.

The path planning module 118 is configured to plan a route for the vehicle 50 based on the map generated by the mapping and localization module 114. The route planned by the path planning module 118 takes into account any objects identified by the sensor module 112. For example, when the sensor module 112 identifies a pedestrian, the path planning module 118 will plan a route that avoids the pedestrian. The route planned by the path planning module 118 can also be planned to avoid any other objects, such as other vehicles, buildings, or any other obstacles. The path planning module 118 is configured to direct the vehicle 50 along the route by continuously generating positions or waypoints for the vehicle 50 to travel to in order to keep the vehicle 50 traveling along the path generated by the path planning module 118. The path planning module 118 sends the waypoints to the control module 120.

The control module 120 receives the waypoints from the path planning module 118, as well as the location of any relevant objects identified by the sensor module 112 in the three-dimensional image. The control module 120 is configured to control the various features of the sensor and route control system 52, including at least the following based on the waypoints generated by the path planning module 118 and location of the objects identified by the sensor module: angle of the first and second camera mounts 58 and 60 at block 122; angle of the steering wheel of the vehicle 50 at block 124; throttle settings of a throttle of the vehicle 50 at block 126; settings of brakes of the vehicle 50 at block 128; and gearshift settings of a gearbox of the vehicle 50 at block 130.

Figure 4A:
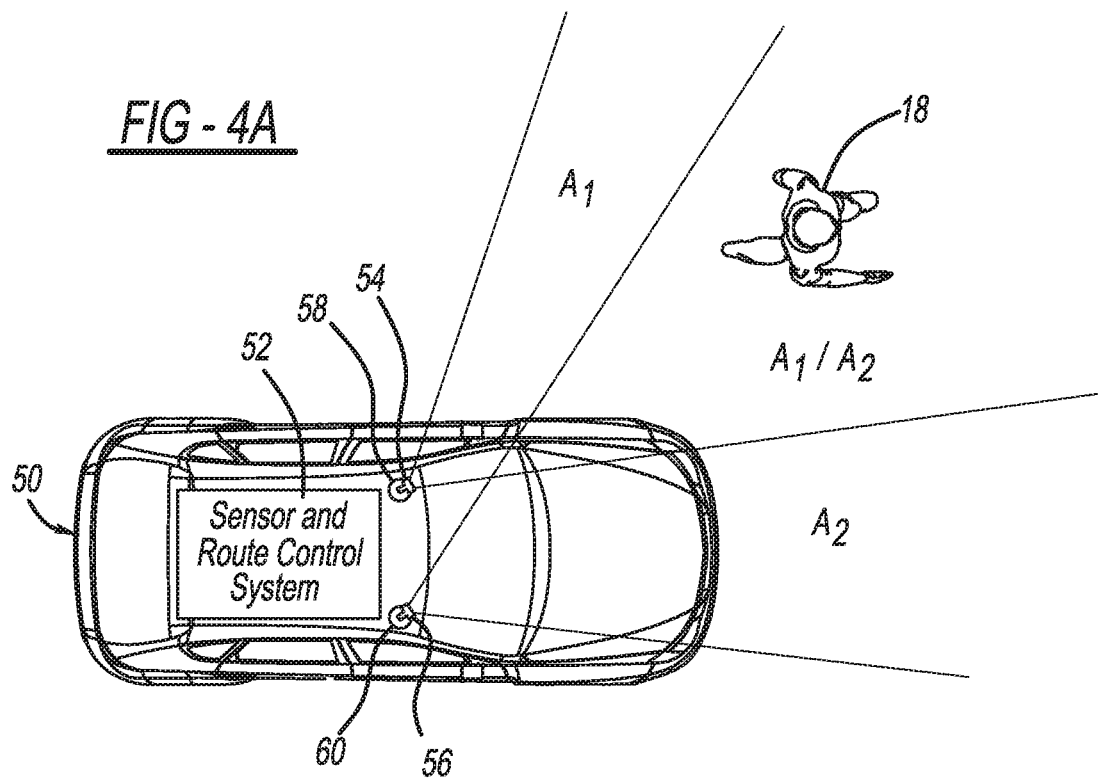
FIG. 4A is a top view of the vehicle of FIG. 2 with the two cameras of the sensor and route control system according to the present teachings rotated to the left.
Figure 4B:
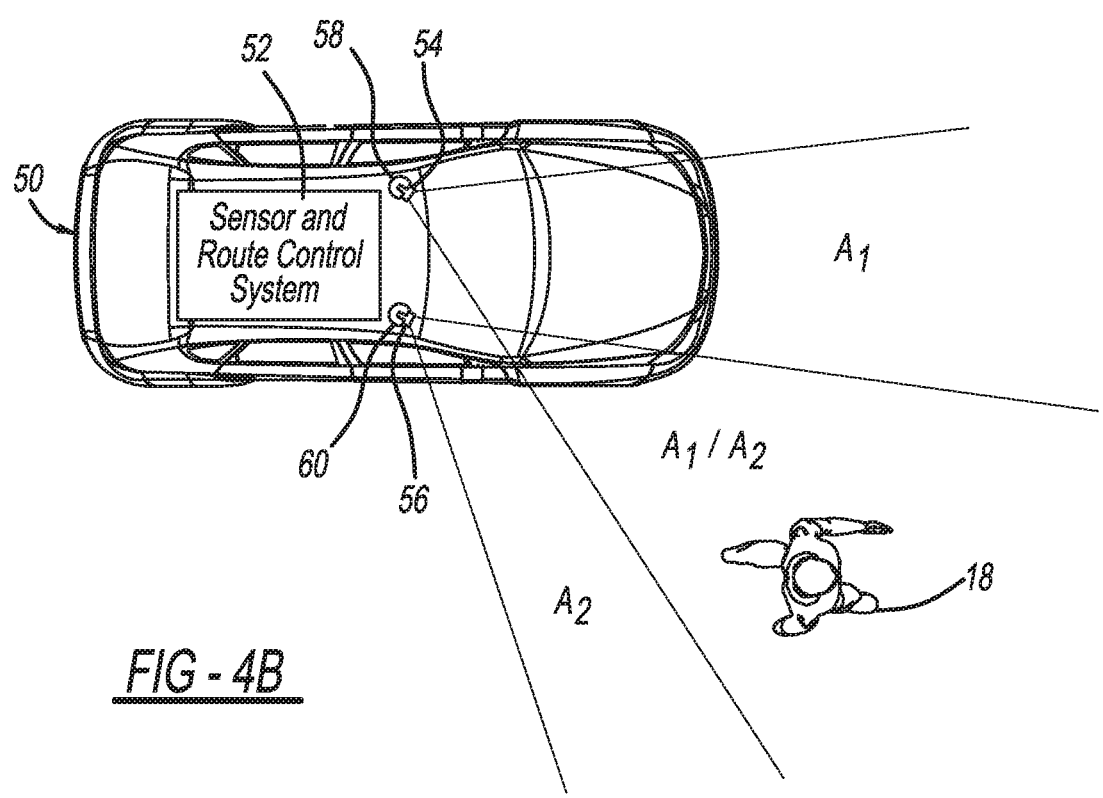
FIG. 4B is a top view of the vehicle of FIG. 2 with the two cameras of the sensor and route control system according to the present teachings rotated to the right.
Figure 5A:
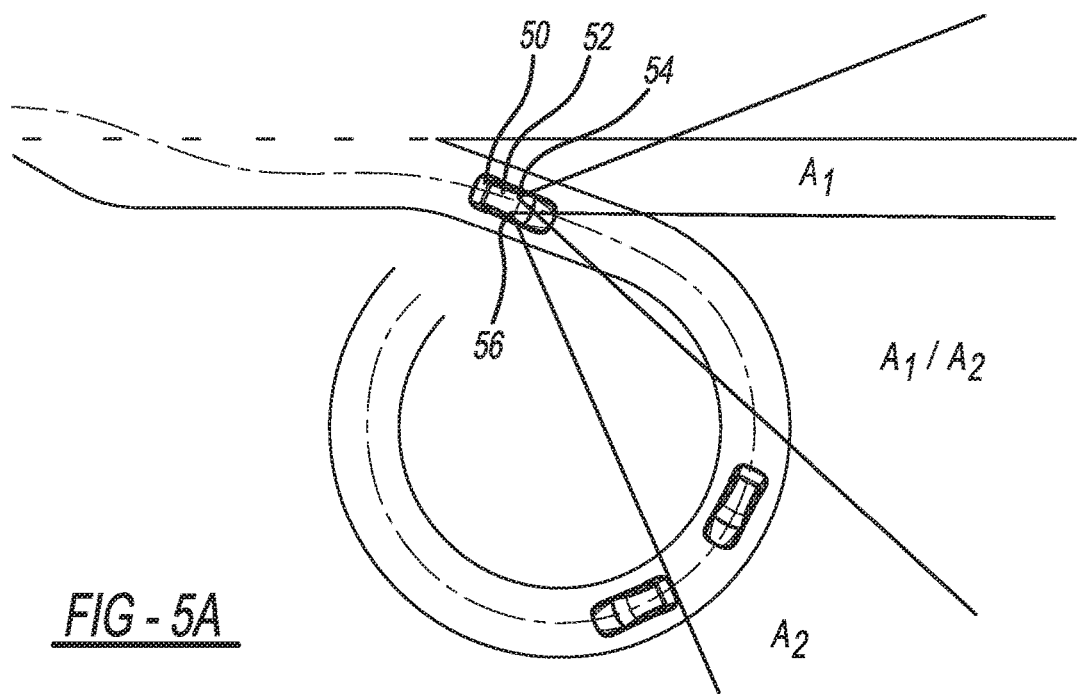
FIG. 5A illustrates a vehicle including the sensor and route control system of the present teachings traveling through a curve, with the two cameras of the system directed straight ahead.
Figure 5B:
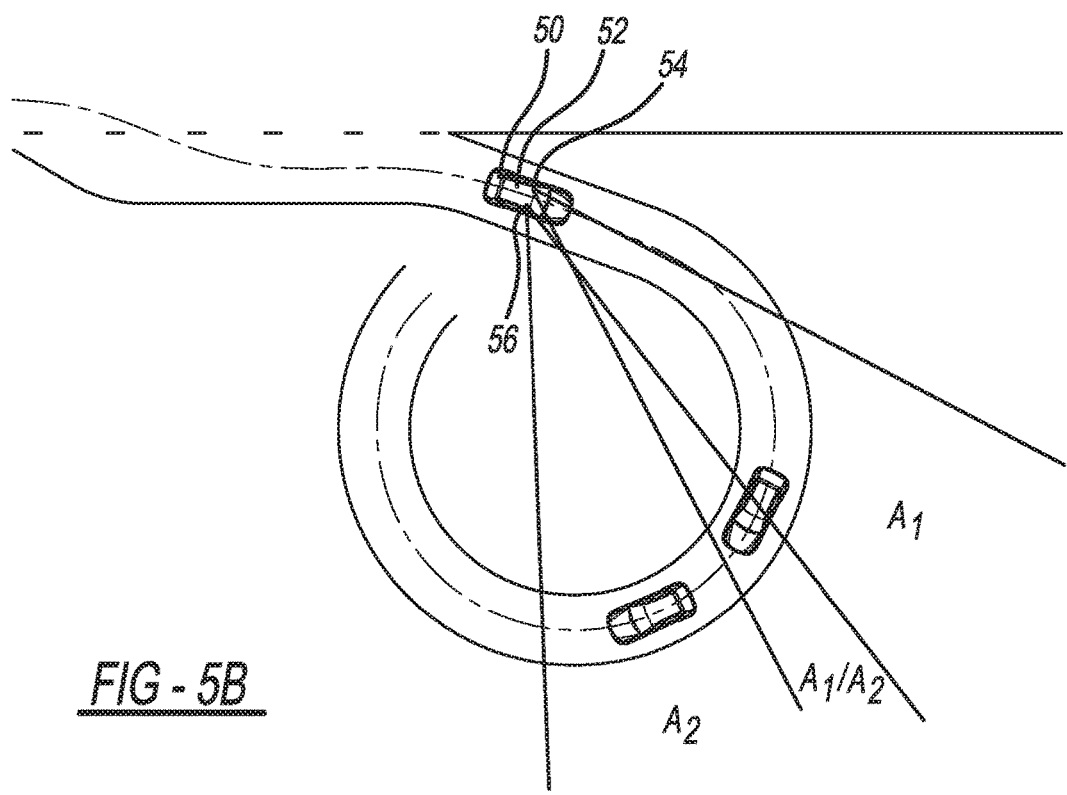
FIG. 5B is similar to FIG. 5A, but with the two cameras rotated to the right.

Thus the control module 120 is configured to change the angle of the first and second camera mounts 58 and 60 (such as by moving the mounts 58 and/or 60 left, right, up, or down) in order to track an object identified in the three-dimensional image by the sensor module 112, and/or in response to a change in the steering wheel angle. For example, and with reference to FIG. 4A, if the control module 120 determines that the steering wheel has been turned to the left, and/or that an object being tracked (such as pedestrian 18) is moving to the left, the control module 120 can rotate the first and second camera mounts 58 and 60 to the left, thereby rotating the first and second sensors 54 and 56, as well as the fields of vision $A_1$, $A_2$, and $A_1/A_2$ to the left. FIG. 4B is similar to FIG. 4A, but with the first and second camera sensors 54 and 56 rotated to the right, such as in response to the steering wheel being turned to the right and/or to track pedestrian 18. With reference to FIGS. 5A and 5B, the control module 120 can generate a command to the mounts 58 and 60 for turning the first and second camera sensors 54 and 56 from a straight ahead position (FIG. 5A) to the right (FIG. 5B) when the vehicle 50 is rounding a right-hand curve, or to the left if the curve is a left-hand curve. The control module 120 can also control the angle of the steering wheel, the throttle setting, the brake setting, and the gearshift setting in order to guide the vehicle 50 along the path planned by the path planning module 118, as well as to avoid any objects identified in the three-dimensional image by the sensor module 112.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A sensor system for a vehicle comprising:
   a first camera sensor and a second camera sensor configured to be mounted spaced apart from one another on a vehicle such that the first camera sensor is on a left side of the vehicle and the second camera sensor is on a right side of the vehicle;
   a first camera mount for the first camera sensor, the first camera mount configured to move the first camera sensor left, right, up, and down;
   a second camera mount for the second camera sensor, the second camera mount configured to move the second camera sensor left, right, up, and down;
   a control module that moves the first camera mount and the second camera mount in unison such that the first camera sensor and the second camera sensor face the same direction; and
   a sensor module configured to generate a three-dimensional image of an environment about the vehicle based on data collected by the first camera sensor and the second camera sensor by fusing a first image from the first camera sensor with a second image from the second camera sensor.

2. The sensor system of claim 1, wherein the sensor system consists of only two sensor cameras.

3. The sensor system of claim 1, wherein the sensor module is further configured to identify objects in the three-dimensional image including pedestrians, vehicles, buildings, and obstacles.

4. The sensor system of claim 1, further comprising a mapping and localization module configured to generate a map of the environment based on the three-dimensional image generated by the sensor module, and identify position of the vehicle on the map.

5. The sensor system of claim 4, further comprising a path planning module configured to plan a route for the vehicle based on the map generated by the mapping and localization module.

6. The sensor system of claim 5, wherein the control module is configured to control at least one of the following based on the route planned for the vehicle by the path planning module: steering angle of the vehicle; vehicle throttle; vehicle braking; and vehicle gear shift.

7. The sensor system of claim 1, wherein the control module is configured to control movement of the first camera mount and the second camera mount based on at least one of location of an object identified by the sensor module, a steering angle of the vehicle, and an anticipated route of the vehicle.

8. The sensor system of claim 1, wherein the control module is configured to control at least one of the following based on location of an object identified by the sensor module: steering angle of the vehicle; vehicle throttle; vehicle braking; and vehicle gear shift.

9. A sensor system for a vehicle comprising:
   a first camera sensor mounted to a left side of a vehicle;
   a first camera mount for mounting the first camera sensor to the left side of the vehicle, the first camera mount configured to move the first camera sensor left, right, up, and down;
   a second camera mounted to a right side of a vehicle;
   a second camera mount for mounting the second camera sensor to the right side of the vehicle, the second camera mount configured to move the second camera sensor left, right, up, and down;

a sensor module configured to generate a three-dimensional image of an environment about the vehicle by combining a first image collected by the first camera sensor and a second image collected by the second camera sensor, the sensor module further configured to identify objects in the three-dimensional image including pedestrians, vehicles, buildings, and obstacles; and a control module configured to control rotation of the first camera mount and the second camera mount in unison such that the first camera mount and the second camera mount face the same direction based on at least one of location of an object identified by the sensor module, a steering angle of the vehicle, and an anticipated route of the vehicle.

10. The sensor system of claim 9, wherein the sensor system consists of only two sensor cameras.

11. The sensor system of claim 9, the control module is further configured to control at least one of the following based on location of an object identified by the sensor module: steering angle of the vehicle; vehicle throttle; vehicle braking; and vehicle gear shift.

12. The sensor system of claim 9, further comprising a mapping and localization module configured to generate a map of the environment based on the three-dimensional image generated by the sensor module, and identify position of the vehicle on the map.

13. The sensor system of claim 12, further comprising a path planning module configured to plan a route for the vehicle based on the map generated by the mapping and localization module.

14. The sensor system of claim 13, further comprising a control module configured to control at least one of the following based on the route planned for the vehicle by the path planning module: steering angle of the vehicle; vehicle throttle; vehicle braking; and vehicle gear shift.

15. A method for tracking objects with a vehicle sensor system comprising:

capturing images of an environment about the vehicle with a first camera sensor mounted to a left side of a vehicle with a first camera mount configured to move the first camera sensor left, right, up, and down;

capturing images of the environment about the vehicle with a second camera sensor mounted to a right side of the vehicle with a second camera mount configured to move the second camera sensor left, right, up, and down;

combining images captured by the first camera sensor and the second camera sensor to generate three-dimensional fused images of the environment;

identifying an object in the three-dimensional images, the object including at least one of a pedestrian, vehicle, building, and obstacle; and moving the first camera sensor and the second camera sensor in unison such that the first camera sensor and the second camera sensor face the same direction based on at least one of location of the object identified in the three-dimensional images, a steering angle of the vehicle, and an anticipated route of the vehicle.

16. The method of claim 15, further comprising:

generating a map of the environment about the vehicle based on the generated three-dimensional images, and identifying position of the vehicle on the map; and planning a route for the vehicle based on the map.

17. The method of claim 16, further comprising modifying at least one of the following based on the route planned for the vehicle: steering angle of the vehicle, vehicle throttle, vehicle braking, and vehicle gear shift.

18. The method of claim 15, further comprising modifying at least one of the following based on location of the object identified by the sensor module: steering angle of the vehicle; vehicle throttle; vehicle braking; and vehicle gear shift.

* * * * *